(12) United States Patent
Aiso et al.

(10) Patent No.: US 11,441,947 B2
(45) Date of Patent: Sep. 13, 2022

(54) SPECTROMETRY METHOD AND SPECTROMETRY APPARATUS

(71) Applicant: SEIKO EPSON CORPORATION, Tokyo (JP)

(72) Inventors: Seiji Aiso, Shiojiri (JP); Ryohei Kuri, Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 149 days.

(21) Appl. No.: 17/093,663

(22) Filed: Nov. 10, 2020

(65) Prior Publication Data
US 2021/0140820 A1    May 13, 2021

(30) Foreign Application Priority Data

Nov. 12, 2019   (JP) .............................. JP2019-204506

(51) Int. Cl.
*G01J 3/28*   (2006.01)
*G06F 3/04817*   (2022.01)
*G09G 5/02*   (2006.01)
*G01J 3/02*   (2006.01)
*G01J 3/26*   (2006.01)

(52) U.S. Cl.
CPC ............... *G01J 3/2823* (2013.01); *G01J 3/02* (2013.01); *G01J 3/26* (2013.01); *G09G 5/02* (2013.01); *G06F 3/04817* (2013.01); *G09G 2354/00* (2013.01)

(58) Field of Classification Search
None
See application file for complete search history.

(56) References Cited

U.S. PATENT DOCUMENTS

| 2007/0229667 | A1* | 10/2007 | Xu | ........................... H04N 9/73 |
| | | | | 348/E17.005 |
| 2013/0050504 | A1* | 2/2013 | Safaee-Rad | .......... G09G 3/2003 |
| | | | | 348/181 |
| 2014/0085647 | A1* | 3/2014 | Hirano | .................. H04N 1/6027 |
| | | | | 358/1.9 |

FOREIGN PATENT DOCUMENTS

JP          2013170867 A       9/2013

* cited by examiner

*Primary Examiner* — Shawn Decenzo
(74) *Attorney, Agent, or Firm* — Gang Yu

(57) ABSTRACT

A spectrometry method used with an apparatus including a spectrometry section, a spectroscopic controller, a spectroscopic image generator, and a display section, the method including generating a teaching-purpose spectroscopic image, generating and displaying a teaching-purpose visualized image, identifying a first teaching area in the teaching-purpose visualized image and generating a first teaching-purpose spectrum, displaying a first icon based on the display color of the first teaching area, accepting teacher data that teaches chromaticity in correspondence with the first icon, generating a conversion rule based on the relationship between the spectrum and the teacher data, generating a measurement-purpose spectrum, and calculating chromaticity based on the conversion rule.

5 Claims, 4 Drawing Sheets

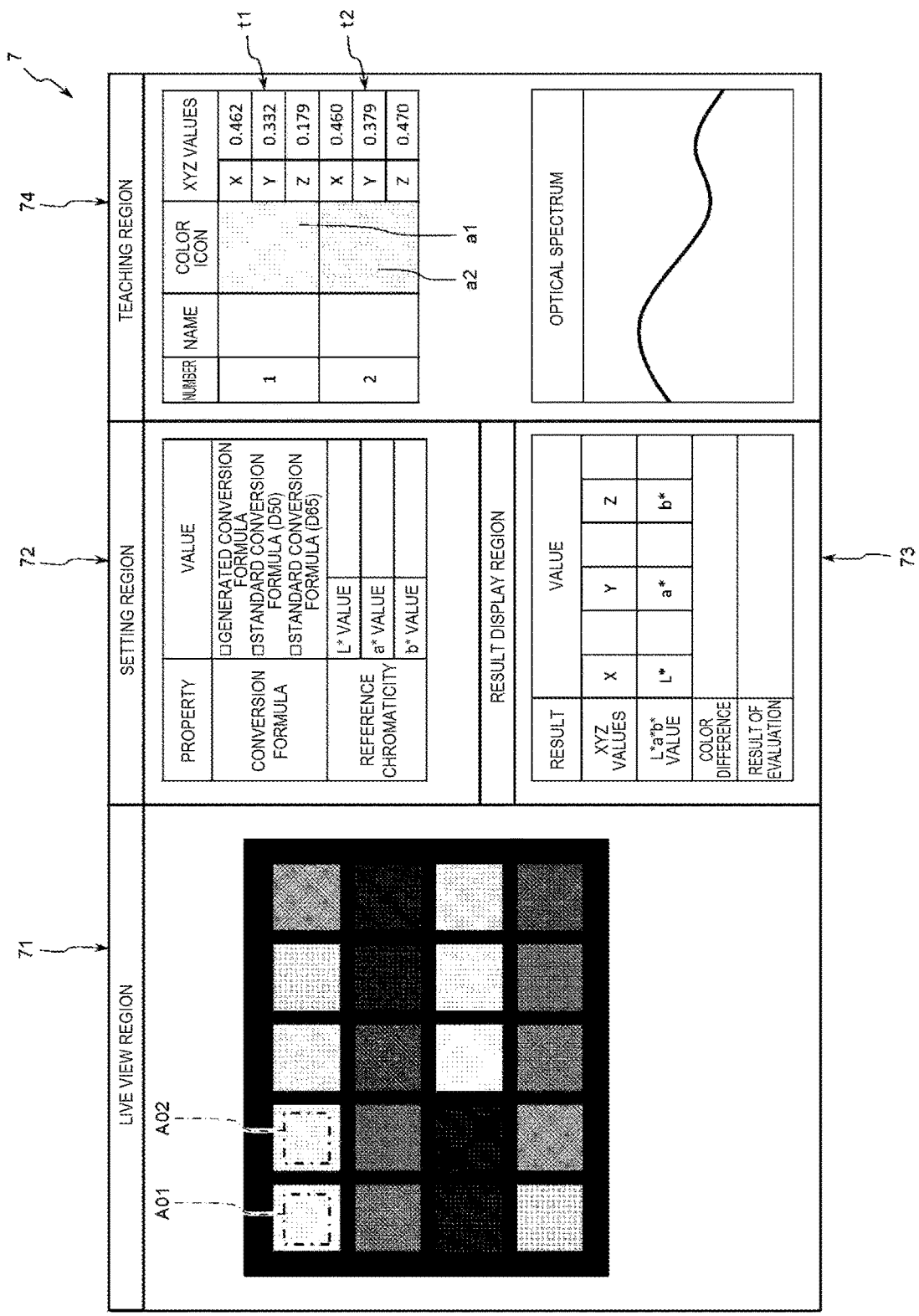

SPECTROMETRY METHOD AND SPECTROMETRY APPARATUS

The present application is based on, and claims priority from JP Application Serial Number 2019-204506, filed Nov. 12, 2019, the disclosure of which is hereby incorporated by reference herein in its entirety.

BACKGROUND

1. Technical Field

The present disclosure relates to a spectrometry method and a spectrometry apparatus.

2. Related Art

There is a known apparatus that captures light reflected off an imaging target to generate a spectroscopic image.

For example, JP-A-2013-170867 discloses a spectrometry apparatus including a telecentric optical system, a wavelength variable interference filter that extracts light having a predetermined wavelength from the light having passed through the telecentric optical system, a wavelength switcher, and a light receiver that receives the light having passed through the wavelength variable interference filter and the wavelength switcher. The wavelength variable interference filter includes an electrostatic actuator that changes the size of a gap in the wavelength variable interference filter to extract light having a desired wavelength based on the size of the gap. Voltage applied to the electrostatic actuator can be changed to change the peak wavelength of the light that passes through the wavelength variable interference filter. A spectroscopic image corresponding to a desired peak wavelength can thus be acquired.

The thus configured spectrometry apparatus allows colorimetry based on an optical spectrum provided from the spectroscopic image. When colorimetry is performed, the result of the colorimetry changes in accordance with environment conditions under which the colorimetry is performed, for example, the optical system of the spectrometry apparatus, illumination conditions, and the positional relationship between the imaging target and the spectrometry apparatus. To accurately perform the colorimetry, it is therefore necessary to teach the spectrometry apparatus in advance under the environment in which the colorimetry is actually performed the relationship between an optical spectrum and the chromaticity of a specimen from which the optical spectrum is acquired.

It is, however, necessary in the task of teaching of the relationship described above to teach the relationship between a large number of optical spectra and chromaticity values, which is a cumbersome task. There is therefore a problem of a risk of a wrong procedure of the task.

SUMMARY

A spectrometry method according to an application example of the present disclosure is a spectrometry method used with a spectrometry apparatus including a spectrometry section including a spectrometer that spectrally separates reflected light reflected off an imaging target to select light having a predetermined wavelength and an imaging device that captures a spectroscopic image based on light fluxes having a plurality of wavelengths selected by the spectrometer, a spectroscopic controller that controls an action of the spectrometer, a spectroscopic image generator that generates the spectroscopic image, and a display section that displays a teaching-purpose visualized image that is an image that visualizes the imaging target, the method including a teaching-purpose spectroscopic image generation step of generating a teaching-purpose spectroscopic image as the spectroscopic image, a teaching-purpose visualized image generation step of generating the teaching-purpose visualized image and causing the display section to display the generated teaching-purpose visualized image, a first teaching-purpose spectrum generation step of identifying a first teaching area in the teaching-purpose visualized image and generating a first teaching-purpose spectrum that is an optical spectrum of the first teaching area from the teaching-purpose spectroscopic image, a first icon display step of calculating a first display color based on a display color of the first teaching area of the teaching-purpose visualized image and causing the display section to display a first icon showing the first display color, a first chromaticity teaching step of accepting input of first teacher data that teaches chromaticity of the first teaching area in a position in the display section that is a position corresponding to the first icon, a conversion rule generation step of generating a conversion rule based on a relationship between the first teaching-purpose spectrum and the first teacher data, a measurement-purpose spectroscopic image generation step of generating a measurement-purpose spectroscopic image as the spectroscopic image, a measurement-purpose spectrum generation step of generating from the measurement-purpose spectroscopic image a measurement-purpose spectrum that is an optical spectrum, and a chromaticity calculation step of calculating chromaticity from the measurement-purpose spectrum based on the conversion rule.

BRIEF DESCRIPTION OF THE DRAWINGS

FIG. 5 shows an example of an operation screen displayed by a display section to perform the spectrometry method shown in FIGS. 3 and 4.

DESCRIPTION OF EXEMPLARY EMBODIMENTS

A spectrometry method and a spectrometry apparatus according to the present disclosure will be described below in detail based on an embodiment shown in the accompanying drawings.

1. Spectrometry Apparatus

A spectrometry apparatus according to an embodiment will first be described.

Figure 1:
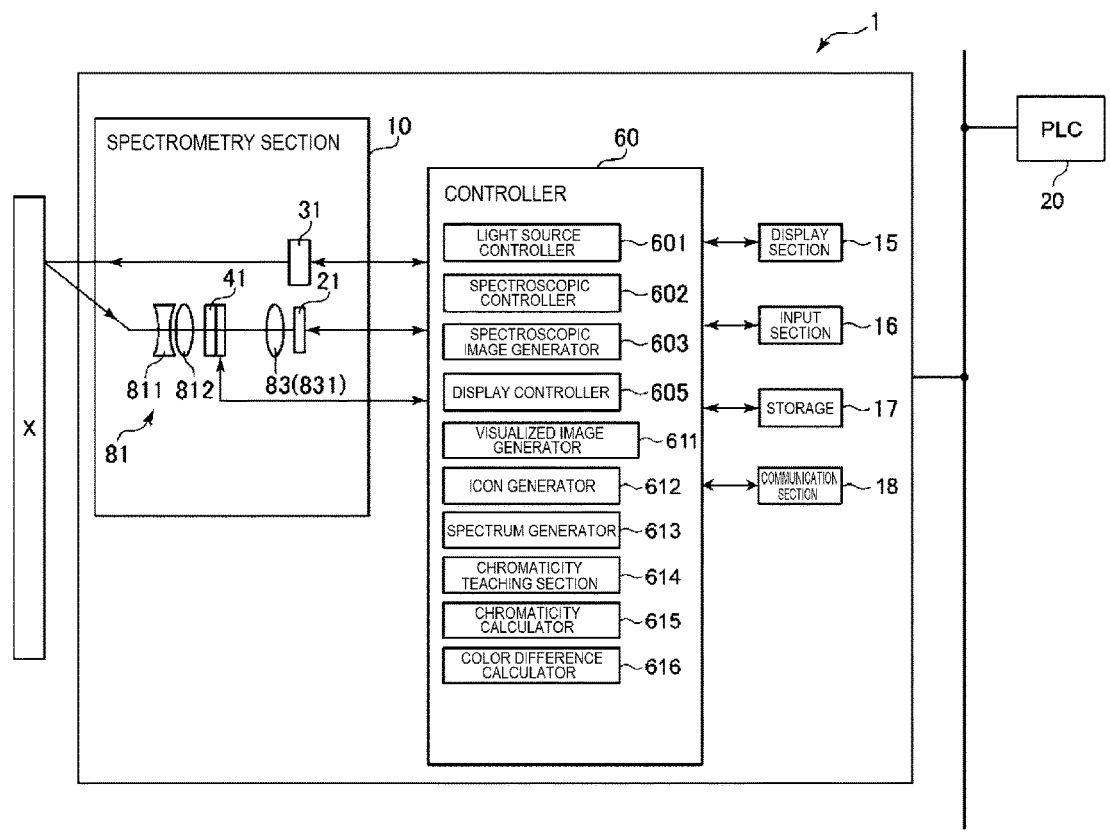
FIG. 1 is a functional block diagram showing a spectrometry apparatus according to an embodiment.
Figure 2:
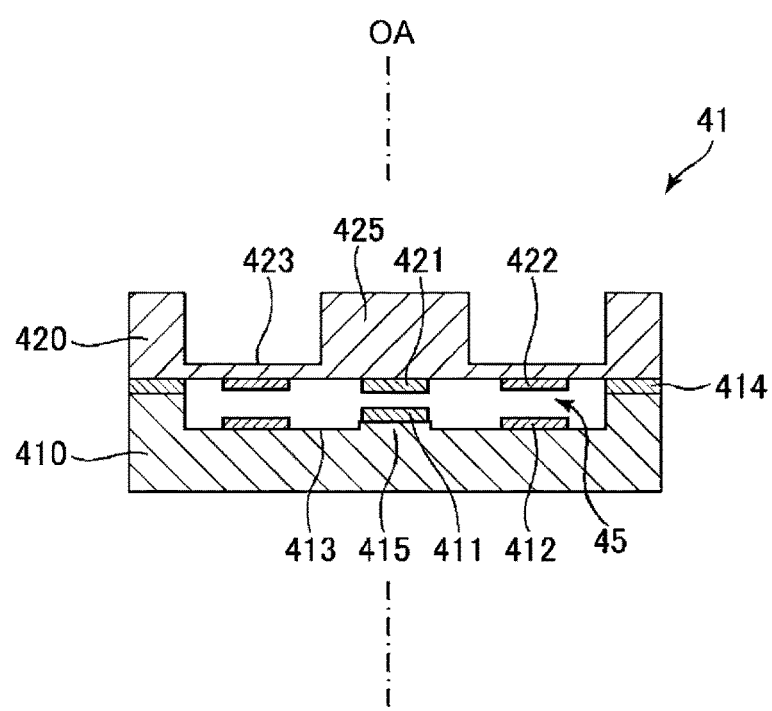
FIG. 2 is a cross-sectional view of a spectrometer shown in FIG. 1.

FIG. 1 is a functional block diagram showing the spectrometry apparatus according to the embodiment. FIG. 2 is a cross-sectional view of a spectrometer shown in FIG. 1.

The spectrometry apparatus 1 shown in FIG. 1 is also called a spectroscopic camera and is an apparatus that spectrally separates reflected light reflected off an imaging target X to acquire a spectroscopic image based on light fluxes having a plurality of wavelengths and a spectrum determined from the spectroscopic image.

The spectrometry apparatus 1 includes a spectrometry section 10, a controller 60, a display section 15, an input section 16, a storage 17, and a communication section 18. The portions described above will be sequentially described below.

1.1. Spectrometry Section

The spectrometry section 10 includes a light source 31, an imaging device 21, and a spectrometer 41.

The light source 31 is a device that radiates light to the imaging target X. The light radiated to and reflected off the imaging target X is incident as the reflected light on the imaging device 21 via the spectrometer 41, which will be described later. The light source 31 may be provided separately from the spectrometry apparatus 1.

Examples of the light source 31 may include a LED (light emitting diode) device, an organic EL (electro-luminescence) device, a xenon lamp, and a halogen lamp. The light source 31 is preferably a light source that outputs light having optical intensity across the entire wavelength range over which the spectrometer 41, which will be described later, can spectrally separates the light. Specifically, the light source 31 is preferably a light source capable of outputting white light having optical intensity across the entire visible light region. The light source 31 may instead be a device capable of radiating light that belongs to a wavelength range excluding that of white light, for example, light excluding visible light, such as infrared light.

The imaging device 21 is a device that captures the reflected light reflected off the imaging target X. The imaging device 21 is preferably a monochromatic imaging device because the spectrometer 41, which will be described later, selects light that belongs to a specific wavelength region out of the reflected light and the selected light is incident on the imaging device 21.

Examples of the imaging device 21 may include a CCD (charge coupled device) and a CMOS (complementary metal oxide semiconductor) device.

The spectrometer 41 is an optical element having the function of outputting (transmitting) the light that belongs to the specific wavelength region selectively out of the light incident on the spectrometer 41. The light outputted from the spectrometer 41 is incident on the imaging device 21.

The spectrometer 41 shown in FIG. 2 is a wavelength variable interference filter capable of changing the wavelength region of the light outputted from the spectrometer 41, that is, the specific wavelength region.

Examples of the wavelength variable interference filter may include a wavelength variable Fabry-Perot etalon filter, an acousto-optical tunable filter (AOTF), a linear variable filter (LVF), and a liquid crystal tunable filter (LCTF). Among them, the wavelength variable Fabry-Perot etalon filter is preferably used as the wavelength variable interference filter. In the wavelength variable Fabry-Perot etalon filter, an electrostatic actuator 45, which will be described later, or any other component can adjust the size of the gap between two filters (mirrors). The specific wavelength region can thus be changed.

The Fabry-Perot etalon filter uses multiple interference that occurs between the two filters to extract light that belongs to the specific wavelength region. The filters can each be thin, whereby the spectrometer 41 in the form of the Fabry-Perot etalon filter can be sufficiently thin. Specifically, the thickness of the spectrometer 41 can be set at a value smaller than or equal to 2.0 mm. Therefore, the size of the spectrometer 41 and in turn the size of the spectrometry apparatus 1 can be reduced.

FIG. 2 shows the spectrometer 41 in the form of a wavelength variable Fabry-Perot etalon filter as the wavelength variable interference filter.

The spectrometer 41 shown in FIG. 2 is a plate-shaped member that has an optical axis OA extending upward and downward in FIG. 2 and spreads in a direction that intersects the optical axis OA. The thus configured spectrometer 41 includes a fixed substrate 410, a movable substrate 420, a fixed reflection film 411, a movable reflection film 421, a fixed electrode 412, a movable electrode 422, and a bonding film 414. The fixed substrate 410 and the movable substrate 420 are integrally bonded to each other via the bonding film 414 with the fixed substrate 410 and the movable substrate 420 layered on each other.

The fixed substrate 410 has a reflection film placement section 415, which is located in a central portion of the fixed substrate 410, and a groove 413, which surrounds the reflection film placement section 415, in a plan view viewed from a position on the optical axis OA. The fixed substrate 410 is so configured that the portion corresponding to the reflection film placement section 415 has a length along the optical axis OA, that is, a thickness greater than the length along the optical axis OA, that is, the thickness of the portion corresponding to the groove 413. The fixed reflection film 411 is provided on a surface of the reflection film placement section 415 that is the surface facing the movable substrate 420. The fixed reflection film 411 functions as a fixed optical mirror that is one of the optical elements of the Fabry-Perot etalon filter.

The movable substrate 420 has a reflection film placement section 425, which is located in a central portion of the movable substrate 420, and a groove 423, which surrounds the reflection film placement section 425, in the plan view viewed from a position on the optical axis OA. The reflection film placement section 425 has a length along the optical axis OA, that is, a thickness greater than the thickness of the groove 423. The movable reflection film 421 is provided on a surface of the reflection film placement section 425 that is the surface facing the fixed substrate 410. The movable reflection film 421 functions as a movable optical mirror that is also one of the optical elements of the Fabry-Perot etalon filter.

The fixed electrode 412 is provided on a surface of the groove 413 provided in the fixed substrate 410 that is the surface facing the movable substrate 420. The movable electrode 422 is provided on a surface of the groove 423 provided in the movable substrate 420 that is the surface facing the fixed substrate 410. When voltage is applied to the gap between the fixed electrode 412 and the movable electrode 422, electrostatic attraction occurs and adjusts the size of the gap between the fixed reflection film 411 and the movable reflection film 412. The fixed electrode 412 and the movable electrode 422 form an electrostatic actuator 45. Since the movable electrode 422 is provided in the position corresponding to the groove 423, the movable reflection film 421 can be displaced by a large amount when the electrostatic attraction occurs.

The thickness of the fixed substrate 410 and the thickness of the movable substrate 420 are each preferably greater than or equal to about 0.1 mm but smaller than or equal to about 1.0 mm. The thus set thicknesses allow the thickness of the overall spectrometer 41 to be suppressed to a value smaller than or equal to 2.0 mm. The size of the spectrometry section 10 can thus be reduced.

The fixed reflection film 411 and the movable reflection film 421 are so disposed as to face each other via the gap. The fixed electrode 412 and the movable electrode 422 are also so disposed as to face each other via a gap. The fixed electrode 412 and the movable electrode 422 form the electrostatic actuator 45, which adjusts the size of the gap between the fixed reflection film 411 and the movable reflection film 421, as described above. Specifically, the electrostatic attraction produced when voltage is applied to the gap between the fixed electrode 412 and the movable electrode 422 flexes the movable substrate 420. As a result, the size of the gap, that is, the distance between the fixed reflection film 411 and the movable reflection film 421 can be changed. Setting the size of the gap as appropriate allows selection of a wavelength region of the light passing through the spectrometer 41 along the optical axis OA. That is, the specific wavelength region can be changed. Further, changing the configuration of the fixed reflection film 411 and the movable reflection film 421 allows control of the full width at half maximum of the spectrum of the light passing through the Fabry-Perot etalon filter, that is, the resolution of the Fabry-Perot etalon filter.

The fixed substrate 410 and the movable substrate 420 are each made, for example, of any of a variety of glass materials, such as soda glass, crystalline glass, quartz glass, lead glass, potassium glass, borosilicate glass, and alkali-free glass, or crystal quartz.

The bonding film 414 bonds the fixed substrate 410 to the movable substrate 420. The bonding film 414 is not limited to a specific film and may, for example, be a plasma polymerization film made primarily of siloxane.

The fixed reflection film 411 and the movable reflection film 421 are each formed, for example, of a metal film made, for example, of Ag or an Ag alloy, or a dielectric multilayer film including a high refraction layer and a low refraction layer.

The fixed electrode 412 and the movable electrode 422 are each made, for example, of any of a variety of electrically conductive materials.

The spectrometry section 10 shown in FIG. 1 further includes a spectrometer-side optical system 81 and an imaging-device-side optical system 83.

The spectrometer-side optical system 81 is disposed between the imaging target X and the spectrometer 41. The spectrometer-side optical system 81 shown in FIG. 1 includes a light incident lens 811 as a light incident optical system and a projection lens 812. The thus configured spectrometer-side optical system 81 guides the reflected light reflected off the imaging target X to the spectrometer 41.

The imaging-device-side optical system 83 is disposed between the spectrometer 41 and the imaging device 21. The imaging-device-side optical system 83 shown in FIG. 1 includes a light-incident/exiting lens 831. The thus configured imaging-device-side optical system 83 guides the outputted light outputted from the spectrometer 41 to the imaging device 21.

Providing the spectrometry section 10 with at least one of the spectrometer-side optical system 81 and the imaging-device-side optical system 83 allows an increase in a light collection capability of the imaging device 21 that is the ratio of the collected light to the reflected light reflected off the imaging target X.

At least one of the spectrometer-side optical system 81 and the imaging-device-side optical system 83 may be omitted in accordance with the light collection capability of the imaging device 21.

The spectrometer-side optical system 81 may be disposed between the spectrometer 41 and the imaging-device-side optical system 83 in place of the position shown in FIG. 1.

The spectrometry section 10 has been described, but the position of the spectrometer 41 is not limited to the position shown in FIG. 1. Specifically, in the spectrometry section 10 shown in FIG. 1, the spectrometer 41 is disposed between the imaging target X and the imaging device 21, and the spectrometer 41 may instead be disposed between the imaging target X and the light source 31.

1.2. Display Section

The display section 15 displays an image that visualizes a spectroscopic image captured with the imaging device 21 and other arbitrary pieces of information.

The display section 15 is formed, for example, of a liquid crystal display device or an organic EL display device.

1.3. Input Section

The input section 16 accepts data necessary for the action of the controller 60 and inputted by a user of the spectrometry apparatus 1.

Examples of the input section 16 may include a touch panel, a slide pad, a keyboard, and a mouse. The input section 16 may be combined and integrated with the display section 15.

1.4. Storage

The storage 17 stores a variety of pieces of information, such as programs and data necessary for the actions of functional portions of the controller 60, data acquired by the spectrometry section 10, data necessary for display operation performed by the display section 15, and data inputted via the input section 16.

The storage 17 is a memory, such as a RAM (random access memory) and a ROM (read only memory).

1.5. Communication Section

The communication section 18 establishes connection to an external apparatus via a network. The network may be a wired or wireless network. The external apparatus is a programmable logic controller (PLC) 20 shown in FIG. 1 and any other arbitrary instrument.

1.6. Controller

The controller 60 shown in FIG. 1 includes a light source controller 601, a spectroscopic controller 602, a spectroscopic image generator 603, a display controller 605, a visualized image generator 611, an icon generator 612, a spectrum generator 613, a chromaticity teaching section 614, a chromaticity calculator 615, and a color difference calculator 616. The actions of the functional portions described above are achieved by the combination of hardware components, such as a CPU (central processing unit) or any other processor, a memory, and an interface to an external component. For example, the controller 60 reads and executes the programs stored in the storage 17 to activate the functional portions and achieve the functions thereof.

The light source controller 601 controls turning on and off the light source 31, the wavelength, the intensity, and other factors of the outputted light, based, for example, on information inputted to the input section 16 and information stored in the storage 17.

The spectroscopic controller 602 acquires based on the information stored in the storage 17 drive voltage corresponding to the specific wavelength region of the light outputted from the spectrometer 41. The spectroscopic controller 602 then outputs a control signal for applying the acquired drive voltage to the electrostatic actuator 45 of the spectrometer 41. The spectroscopic controller 602 can thus control the action of the spectrometer 41 to control the specific wavelength region of the light outputted from the spectrometer 41.

The spectroscopic image generator 603 controls the operation of the spectrometry section 10 to cause the imaging device 21 to capture the light incident thereon via the spectrometer 41. The spectroscopic image generator 603 then generates a spectroscopic image based on captured image data provided from the imaging device 21. The spectroscopic image generator 603 generates a teaching-purpose spectroscopic image and a measurement-purpose spectroscopic image, which will each be described later, in accordance with the purpose of the spectroscopic image. The spectroscopic image generator 603 causes the storage 17 to store the generated spectroscopic image. The spectroscopic image contains captured images at a plurality of wavelengths selected from the reflected light reflected off the imaging target X. The spectroscopic image generator 603 causes the storage 17 to also store the specific wavelength region used when the spectroscopic image is acquired along with the spectroscopic image when storing the spectroscopic image in the storage 17.

The display controller 605 causes the display section 15 to display, for example, the spectroscopic image and the variety of pieces of information in the form of a visualized image.

The visualized image generator 611 generates from the spectroscopic image a visualized image displayable in the display section 15. The visualized image generator 611 generates a teaching-purpose visualized image and a measurement-purpose visualized image, which will each be described later, in accordance with the purpose of the visualized image. The visualized image generator 611 causes the storage 17 to store the generated visualized image and causes the display section 15 to display the generated visualized image.

The icon generator 612 generates, based on a display color of a specific area of the visualized image, an icon showing the display color.

The spectrum generator 613 acquires the optical spectrum at each pixel from the spectroscopic image of the imaging target X and the specific wavelength region stored in the storage 17. The optical spectrum is the optical intensity distribution on a wavelength basis, and an optical spectrum on a pixel basis can be acquired from the spectroscopic image. Therefore, for example, when a predetermined teaching area is specified in the visualized image, the spectrum generator 613 generates a "teaching-purpose spectrum," which is an average optical spectrum of the teaching area, as will be described later. When the chromaticity of the imaging target X is measured, the spectrum generator 613 generates a "measurement-purpose spectrum," which is an average optical spectrum of the imaging target X, as will be described later. In the present specification, the spectra described above are also called "spectroscopic information."

It is assumed in the present embodiment that the optical spectrum is a spectrum provided by measurement of the optical intensities in at least 4 wavelength bands. Further, the optical spectrum according to the present embodiment is preferably a spectrum provided by measurement of the optical intensities in at least 16 wavelength bands.

The spectrum generator 613 may instead be configured to acquire the spectroscopic information based on the information directly acquired from the spectroscopic image generator 603 without using the storage 17. The acquired spectroscopic information is stored in the storage 17.

The chromaticity teaching section 614 generates a conversion rule based on the relationship between the teaching-purpose spectrum and teacher data on the chromaticity values in a color model used to acquire the teaching-purpose spectrum. The teacher data on the chromaticity values is thus taught to the teaching-purpose spectrum. The conversion rule is used to calculate the chromaticity from the measurement-purpose spectrum. The teacher data is, for example, data on highly reliably chromaticity values measured in advance for the color model, for example, by using a colorimeter. In this process, the teacher data is acquired for the color model under a predetermined environment, and the teaching-purpose spectrum is also acquired under the same environment. A conversion rule specific to the environment can thus be generated, and the conversion rule can be used to measure the chromaticity under the environment in a sufficiently accurate manner.

The chromaticity calculator 615 calculates the chromaticity of the imaging target X from the measurement-purpose spectrum based on a conversion formula (generated conversion formula) that is the conversion rule generated by the chromaticity teaching section 614. The chromaticity calculator 615 has the function of causing the display section 15 to display the calculated chromaticity and outputting the calculated chromaticity to a component external to the spectrometry apparatus 1 as required.

The chromaticity calculator 615 may instead be configured as required to calculate the chromaticity based on a standard conversion formula stored in the storage 17 in advance. In this case, the chromaticity calculator 615 selects a conversion formula based, for example, on data inputted via the input section 16. A plurality of standard conversion formulae may be stored in accordance, for example, with the type of standard illumination light.

The color difference calculator 616 calculates the color difference based on the chromaticity determined by the chromaticity calculator 615 and reference chromaticity that serves as a reference. To calculate the color difference, a known color difference formula is used. The color difference calculator 616 may have the function of evaluating whether or not the color difference falls within an acceptable range. In this case, a threshold can be stored in the storage 17 in advance, and the determined color difference can be compared with the threshold to evaluate whether or not the former is smaller than or equal to the latter.

The color difference calculator 616 has the function of causing the display section 15 to display the calculated color difference and the result of the evaluation and outputting the calculated color difference and the result of the evaluation to a component external to the spectrometry apparatus 1 as required.

The spectrometry apparatus 1 has been described above, and the spectrometry apparatus 1 is coupled to the PLC 20 via the network, as shown in FIG. 1. The action of the spectrometry apparatus 1 is thus controlled by a command outputted from the PLC 20. The chromaticity, the color difference, the result of the evaluation, and other pieces of information measured by the spectrometry apparatus 1 are outputted to the arbitrary external instrument via the network.

2. Spectrometry Method

A spectrometry method according to the embodiment will next be described.

Figure 3:
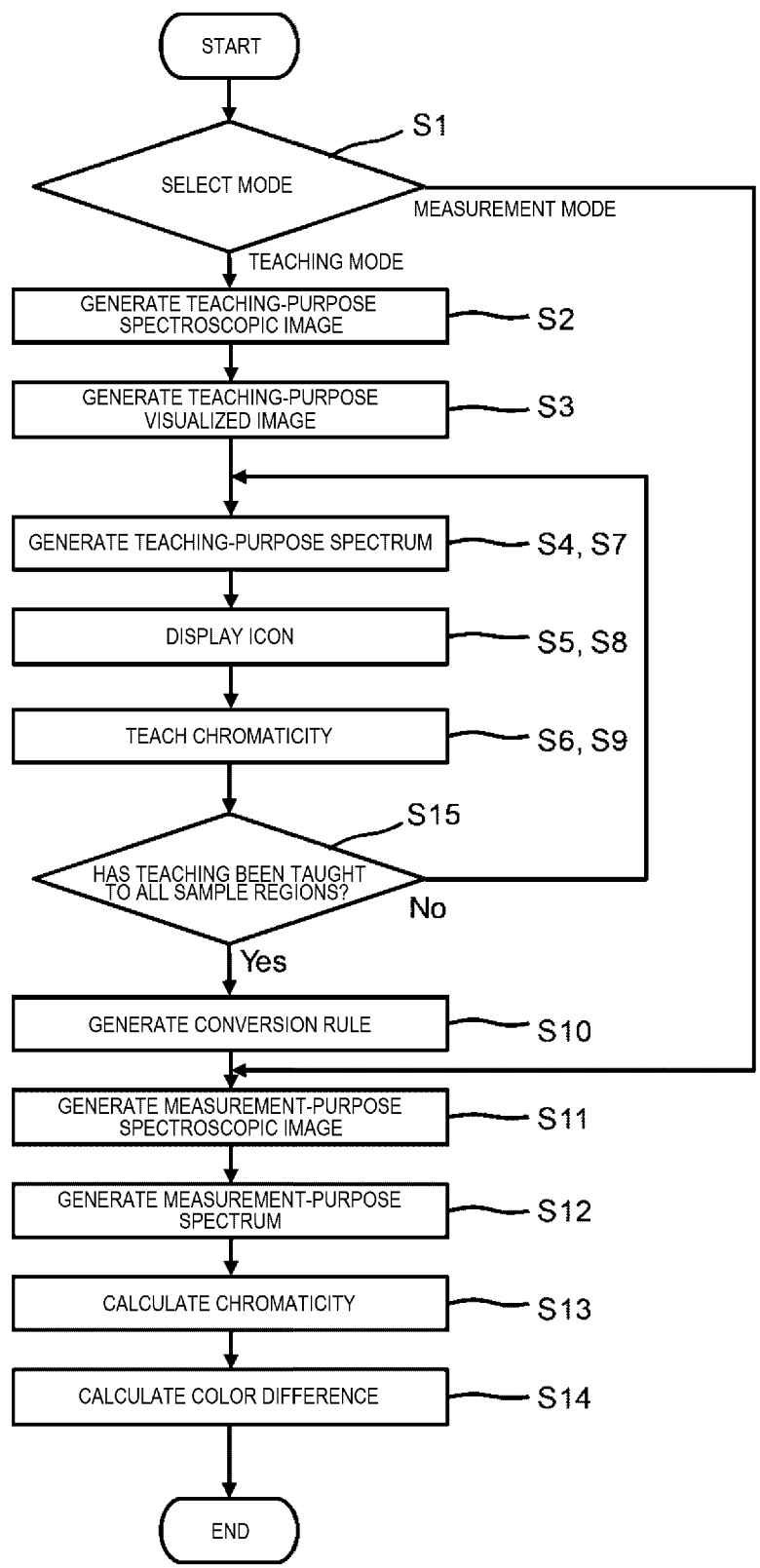
FIG. 3 is a process flowchart showing a spectrometry method according to the embodiment.
Figure 4:
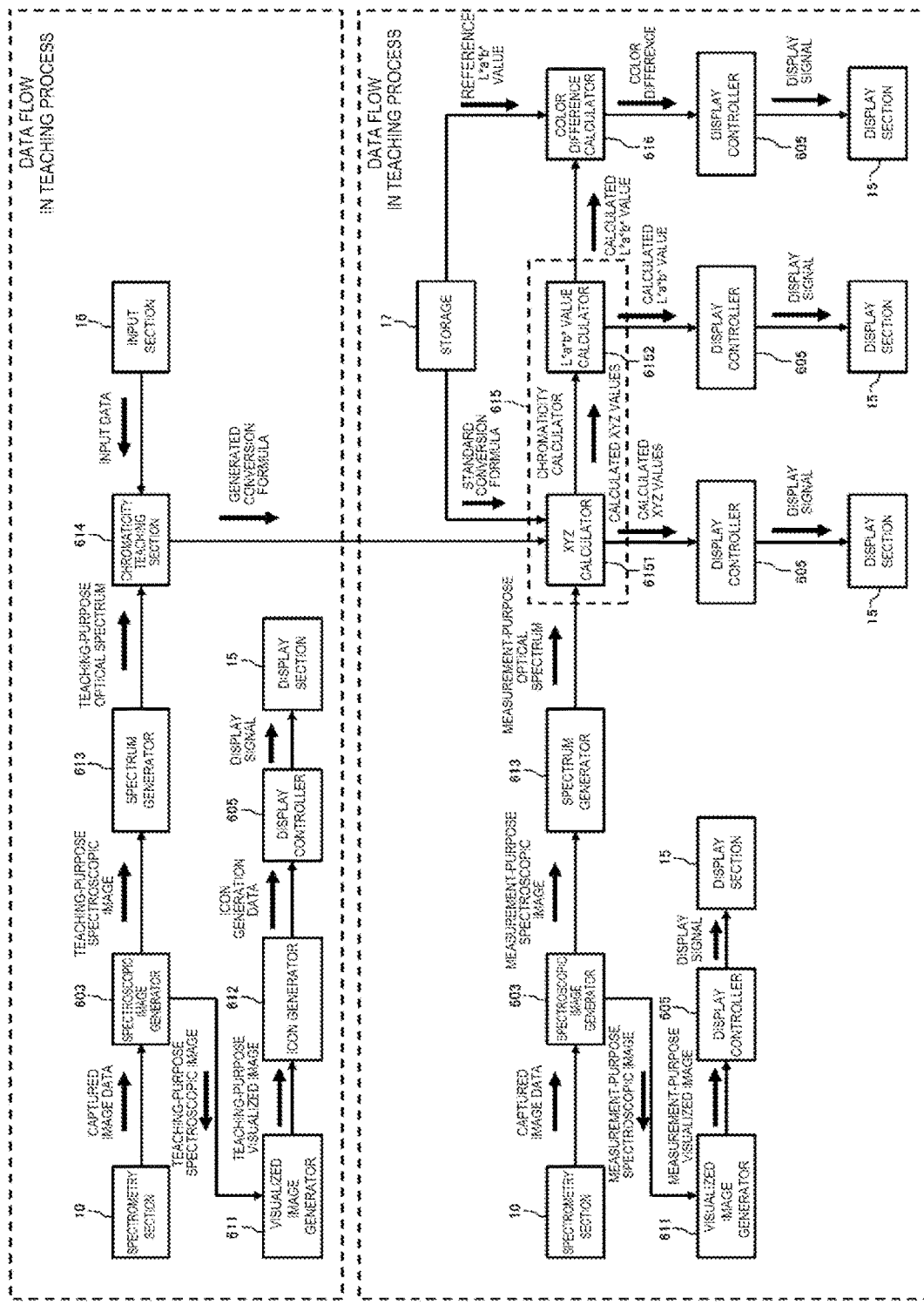
FIG. 4 is a data flowchart showing the spectrometry method shown in FIG. 3.

FIG. 3 is a process flowchart showing a spectrometry method according to the embodiment. FIG. 4 is a data flowchart showing the spectrometry method shown in FIG. 3.

The spectrometry method shown in FIG. 3 includes a mode selection step S1, a teaching-purpose spectroscopic image generation step S2, a teaching-purpose visualized image generation step S3, a first teaching-purpose spectrum generation step S4, a first icon display step S5, a first chromaticity teaching step S6, a second teaching-purpose spectrum generation step S7, a second icon display step S8, a second chromaticity teaching step S9, a conversion rule generation step S10, a measurement-purpose spectroscopic image generation step S11, a measurement-purpose spectrum generation step S12, a chromaticity calculation step S13, and a color different calculation step S14.

FIG. 4 shows the flow of data in the steps shown in FIG. 3. The steps will be sequentially described.

2.1. Mode Selection Step S1

In the mode selection step S1, an operating mode or an editing mode is selected, although not shown. In the editing mode, a setting value to be set in the operating mode, which will be described later, can be edited. On the other hand, in the operating mode, the chromaticity of the imaging target X can be measured.

When the operating mode is selected in the mode selection step S1, a measurement mode or a teaching mode is further selected. The measurement mode is a mode in which the result of the measurement of the chromaticity or any other factor of the imaging target X is outputted, and when the measurement mode is selected, the control proceeds to the measurement-purpose spectroscopic image generation step S11. On the other hand, the teaching mode is a mode in which data necessary for the measurement mode is acquired in advance, and when the teaching mode is selected, the control proceeds to the teaching-purpose spectroscopic image generation step S2.

One of the modes described above is selected based, for example, on a command transmitted from the PLC 20, and the selected mode is carried out.

2.2. Teaching-Purpose Spectroscopic Image Generation Step S2

In the teaching-purpose spectroscopic image generation step S2, the light source controller 601, the spectroscopic controller 602, and the spectroscopic image generator 603 control the action of the spectrometry section 10 to generate a teaching-purpose spectroscopic image based on the captured image data outputted from the spectrometry section 10. The spectroscopic image generator 603 then causes the storage 17 to store the generated teaching-purpose spectroscopic image.

FIG. 5 shows an example of an operation screen displayed by the display section 15 to perform the spectrometry method shown in FIGS. 3 and 4. An operation screen 7 shown in FIG. 5 is a graphical user interface (GUI) that assists the user to input operation via the input section 16 based on the content displayed on the operation screen 7.

The operation screen 7 shown in FIG. 5 contains a live view region 71 (first operation screen), a setting region 72, a result display region 73, and a teaching region 74 (second operation screen).

The live view region 71 is a region where a teaching-purpose visualized image that visualizes the teaching-purpose spectroscopic image generated by the spectroscopic image generator 603 is displayed, for example, in a realtime manner. The live view region 71 may be configured to display a visualized image acquired by an imager provided separately from the spectrometry section 10.

In the example shown in FIG. 5, in the live view region 71, a teaching-purpose visualized image of the color model is displayed in color. In the color model shown in FIG. 5, square sample regions each showing a predetermined color are arranged in a matrix. The sample regions show colors different from one another. FIG. 5 shows that two teaching areas, a first teaching area A01 and a second teaching area A02, out of the plurality of sample regions are selected. The first teaching area A01 and the second teaching area A02 are each a region surrounded by a dashed line, and the position and size of the region are adjusted by operation inputted via the input section 16. FIG. 5 displays dashed lines representing the first teaching area A01 and the second teaching area A02 and superimposed on the teaching-purpose visualized image. The user thus readily visually recognizes the first teaching area A01 and the second teaching area A02, for example, is unlikely to input a wrong specifying position when the user specifies each of the first teaching area A01 and the second teaching area A02. The first teaching area A01 and the second teaching area A02 may be displayed in a mutually exclusive manner.

The setting region 72 is a region where setting values and other values inputted via the input section 16 when the spectrometry method is carried out are displayed. The setting values are not limited to specific values and may, for example, be the position of the first teaching area A01, the type of a conversion formula in the color different calculation step S14, which will be described later, and the reference chromaticity, which is the reference used to calculate the color difference in the color difference calculation step S14, which will be described later, which are specified in the present step.

The result display region 73 is a region where the chromaticity, the color difference, the result of the evaluation, and other factors calculated as a result of the spectrometry method are displayed. Examples of the chromaticity may include XYZ values, which are tristimulus values, and L*a*b* values.

The teaching region 74 is a region where first teacher data t1 or any other data inputted via the input section 16 when the chromaticity of the first teaching area A01 is taught in the first chromaticity teaching step S6, which will be described later, is displayed. The teaching region 74 further displays a first teaching-purpose spectrum generated in the first teaching-purpose spectrum generation step S4, which will be described later. The teaching region 74 still further displays a first icon a1 generated in the first icon display step S5, which will be described later.

2.3. Teaching-Purpose Visualized Image Generation Step S3

The visualized image generator 611 then generates the teaching-purpose visualized image. The teaching-purpose visualized image is generated via a color vision simulation from the teaching-purpose spectroscopic image stored in the storage 17. In the color vision simulation, for example, an RGB color matching function is used to calculate an RGB image from the teaching-purpose spectroscopic image. The RGB image is an image expressed by R, G, and B, which are the three primary colors of light and is an example of the teaching-purpose visualized image.

The teaching-purpose visualized image may instead be an image captured with a camera provided separately from the spectrometry section 10 and capable of capturing a visualized image.

2.4. First Teaching-Purpose Spectrum Generation Step S4

The first teaching area A01 is then specified in the teaching-purpose visualized image, as described above. A sample region showing a predetermined color is, for example, specified in the first teaching area A01.

The spectrum generator 613 then generates from the teaching-purpose spectroscopic image a first teaching-purpose spectrum that is an optical spectrum of the first teaching area A01. Specifically, the spectrum generator 613 reads the teaching-purpose spectroscopic image stored in the storage 17. The spectrum generator 613 then calculates the average of the spectra corresponding to the first teaching area A01 out of the teaching-purpose spectroscopic image as the first teaching-purpose spectrum described above. The calculation method described above is presented by way of example, and a representative value of the spectra may be used in place of the average.

The spectrum generator 613 causes the storage 17 to store the generated first teaching-purpose spectrum.

2.5. First Icon Display Step S5

The icon generator 612 then calculates a first display color based on the display color of the first teaching area A01 of the teaching-purpose visualized image. The first display color is calculated as the average of the colors corresponding to the first teaching area A01 out of the teaching-purpose visualized image. The calculation method described above is presented by way of example, and a representative value of the colors may be used in place of the average.

The icon generator 612 causes the display section 15 to display the first icon a1 showing the generated first display color via the display controller 605. The first icon a1 is an icon showing the first display color and does not necessarily have a specific shape, size, or any other factor as long as the first icon a1 allows the user to recognize the first display color.

2.6. First Chromaticity Teaching Step S6

The chromaticity teaching section 614 then inputs first teacher data t1, which teaches the chromaticity of the first teaching area A01 of the teaching-purpose spectroscopic image, to a position in the operation screen 7 that is the position corresponding to the first icon a1.

In the example of the teaching region 74 shown in FIG. 5, a table for teaching the chromaticity of each of a plurality of teaching areas is displayed. The table shows the number (index) of a teaching area, such as the first teaching area A01, a name given to the color of the teaching area, and an icon (color) showing a display color, such as the first icon a1.

In FIG. 5, the table has input fields to which the XYZ values, which are each the chromaticity, are inputted. The XYZ values correspond to the first teacher data t1 described above, and the XYZ values are, for example, data on sufficiently accurate chromaticity values measured in advance for the color model shown in FIG. 5, for example, by using a colorimeter, as described above. The user inputs the first teacher data t1 into the input fields. The user can readily relate the position of the first icon a1 to the position of the first teacher data t1 by using the table. That is, since the first icon a1 shows the first display color, the user is unlikely to make an input mistake, such as inputting wrong data, when the user inputs the first teacher data t1 corresponding to the first display color to the position corresponding to the first icon a1. As a result, accurate chromaticity can be taught.

Further, in FIG. 5, the live view region 71 and the teaching region 74 are juxtaposed with each other. The live view region 71 displays a line corresponding to the first teaching area A01. The display color displayed in the first teaching area A01 in the live view region 71 and the first display color shown by the first icon a1 can be viewed side by side. Therefore, since the user can select a teaching area in the live view region 71 while looking at the teaching region 74, the user is unlikely to make a selection mistake. For example, when successively assigning the plurality of sample regions to teaching areas, the user is unlikely to accidentally select the same sample region or skip a sample region that should be selected. As a result, accurate chromaticity can be taught.

The teaching region 74 further displays the first teaching-purpose spectrum as well as the table described above.

The number, name, spectrum, and other factors in each teaching area may be provided as required or may be omitted.

As described above, the first teaching-purpose spectrum and the first teacher data t1 can be related to each other.

Thereafter, it is evaluated in a teaching end evaluation step S15 whether or not the chromaticity of another teaching area needs to be taught. When the result of the evaluation shows that the teaching is necessary, the same steps as the first teaching-purpose spectrum generation step S4, the first icon display step S5, and the first chromaticity teaching step S6 described above may be sequentially carried out. Repeating the steps described above allows an increase in the number of teaching areas and an increase in the number of teacher data sets that allow the chromaticity to be taught to the optical spectrum generated from each of the teaching areas. In this case, the number of rows in the table shown in the teaching region 74 may be increased.

A method for teaching second teacher data t2 by specifying the second teaching area A02 will be described below, and the same method described below can be used also for a third teaching area and the following areas.

2.7. Second Teaching-Purpose Spectrum Generation Step S7

The second teaching area A02 is then specified in the teaching-purpose visualized image, as described above. A sample region showing a predetermined color but different from the first teaching area A01 is specified as the second teaching area A02, as described above.

The spectrum generator 613 then generates from the teaching-purpose spectroscopic image a second teaching-purpose spectrum that is an optical spectrum of the second teaching area A02. Specifically, the spectrum generator 613 reads the spectroscopic image stored in the storage 17. The spectrum generator 613 then calculates the average of the spectra corresponding to the second teaching area A02 out of the spectroscopic image as the second teaching-purpose spectrum described above. The calculation method described above is presented by way of example, and a representative value of the spectra may be used in place of the average.

The spectrum generator 613 causes the storage 17 to store the generated second teaching-purpose spectrum.

2.8. Second Icon Display Step S8

The icon generator 612 then calculates a second display color based on the display color of the second teaching area A02 of the teaching-purpose visualized image. The second display color is calculated as the average of the colors corresponding to the second teaching area A02 out of the teaching-purpose visualized image. The calculation method described above is presented by way of example, and a representative value of the colors may be used in place of the average.

The icon generator 612 causes the display section 15 to display a second icon a2 showing the generated second display color via the display controller 605. The second icon a2 is an icon showing the second display color and does not necessarily have a specific shape, size, or any other factor as long as the second icon a2 allows the user to recognize the second display color.

2.9. Second Chromaticity Teaching Step S9

The chromaticity teaching section 614 then inputs the second teacher data t2, which teaches the chromaticity of the second teaching area A02 of the teaching-purpose spectroscopic image, to a position in the operation screen 7 that is the position corresponding to the second icon a2.

In FIG. 5, the display color displayed in the second teaching area A02 in the live view region 71 and the second display color shown by the second icon a2 can be viewed side by side, as described above. Further, the display color displayed as the color of the second teaching area A02 in the live view region 71 is substantially equal to the second display color shown by the second icon a2. Therefore, for example, when the second teaching area A02 should be selected, but the sample region that is the first teaching area A01 is accidentally selected, the second display color becomes equal to the first display color. The user can then readily notice the selection mistake by comparing the second icon a2 with the first icon a1. As a result, the user is unlikely to make a selection mistake, whereby the user can teach accurate chromaticity.

The teaching region 74 further displays the second teaching-purpose spectrum as well as the table described above.

The number, name, spectrum, and other factors in each teaching area may be provided as required or may be omitted.

As described above, the second teaching-purpose spectrum and the second teacher data t2 can be related to each other.

Thereafter, it is evaluated again in the teaching end evaluation step S15 whether or not the chromaticity of another teaching area needs to be taught. It is assumed now that the chromaticity teaching is terminated, and that the control proceeds to the following step.

2.10. Conversion Rule Generation Step S10

The chromaticity teaching section 614 generates the conversion rule from the relationship between the first teaching-purpose spectrum and the first teacher data t1 and the relationship between the second teaching-purpose spectrum and the second teacher data t2. The conversion rule may have any form, and it is assumed below that the conversion rule is expressed by the following conversion formula. An example of a method for establishing the conversion formula will be described below.

The formula below is an example of a formula representing the relationship between a measurement-purpose spectrum "R" generated in the measurement-purpose spectrum generation step S12, which will be described later, and a taught XYZ value "X".

$$X = MsR$$

$$Ms = (R^T R + \beta I)^{-1} (R^T X)$$

In the formula described above, the matrix Ms is a pseudo-inverse matrix. The pseudo-inverse matrix Ms expressed by the formula described above contains a matrix R, a transposed matrix $R^T$ of the matrix R, a matrix X and further contains a regularization term $\beta I$. Using the thus configured matrix Ms allows determination of the chromaticity (XYZ values) from the measurement-purpose spectrum.

The matrix X is a matrix representing a plurality of teacher data sets (XYZ values) including the first teacher data t1 and the second teacher data t2. Therefore, when the number of sample regions in the color model is n, the matrix X is a 3×n matrix expressed by the formula below.

$$X = \begin{pmatrix} X_1 & X_2 & \ldots & X_n \\ Y_1 & Y_2 & \ldots & Y_n \\ Z_1 & Z_2 & \ldots & Z_n \end{pmatrix} \begin{matrix} X\ value \\ Y\ value \\ Z\ value \end{matrix}$$

Sample region No. → 1 2 ... n

The matrix R is a matrix containing optical intensities at the spectroscopic wavelengths, the number of optical intensities being equal to the number of sample regions. Therefore, when the spectrometry section 10 spectrally separates light having wavelengths ranging from 400 to 700 nm into wavelength segments each having a width of 20 nm, and the spectroscopic image generator 603 generates a spectroscopic image, the number of spectroscopic wavelengths is 16. The matrix R is therefore a 16×n matrix expressed by the formula below.

Sample region No. → 1 2 ... n    Spectroscopic wavelength $$R = \begin{pmatrix} R_{1,400} & R_{2,400} & \ldots & R_{n,400} \\ R_{1,420} & R_{2,420} & \ldots & R_{n,420} \\ \vdots & \vdots & & \vdots \\ R_{1,400} & R_{2,700} & \ldots & R_{n,700} \end{pmatrix} \begin{matrix} 400\ nm \\ 420\ nm \\ \vdots \\ 700\ nm \end{matrix}$$

Based on the above discussion, a conversion formula for converting the measurement-purpose spectrum "r" generated in the measurement-purpose spectrum generation step S12, which will be described later, into the XYZ value "x", which is the chromaticity to be determined, is expressed by the formula below.

$$x = Msr$$

Determining the conversion formula under a predetermined environment allows sufficiently accurate, efficient determination of the chromaticity under the environment in the chromaticity calculation step S13, which will be described later.

The steps described above are the steps of teaching the chromaticity, for example, by using a color mode. The steps may be carried out before the measurement at least once as long as the environment does not change.

2.11. Measurement-Purpose Spectroscopic Image Generation Step S11

In the measurement-purpose spectroscopic image generation step S11, the light source controller 601, the spectroscopic controller 602, and the spectroscopic image generator 603 control the action of the spectrometry section 10 to generate a measurement-purpose spectroscopic image based on the captured image data outputted from the spectrometry section 10. The spectroscopic image generator 603 then causes the storage 17 to store the generated measurement-purpose spectroscopic image.

2.12. Measurement-Purpose Spectrum Generation Step S12

The spectrum generator 613 then generates a measurement-purpose spectrum that is an optical spectrum from the measurement-purpose spectroscopic image. Specifically, the spectrum generator 613 reads the measurement-purpose spectroscopic image stored in the storage 17. The spectrum generator 613 then calculates the average of the spectra contained in the measurement-purpose spectroscopic image as the measurement-purpose spectrum.

The spectrum generator 613 causes the storage 17 to store the generated measurement-purpose spectrum.

To determine a measurement-purpose spectrum of part of the measurement-purpose spectroscopic image instead of the entirety of the measurement-purpose spectroscopic image, a specific area of the live view region 71 may be selected. A measurement-purpose spectrum that is the average of the spectra of the specific area can thus be calculated.

2.13. Chromaticity Calculation Step S13

The chromaticity calculator 615 then calculates the chromaticity from the measurement-purpose spectrum based on the conversion rule determined in the conversion rule generation step S10.

The conversion rule may be a conversion formula (generated conversion formula) generated from a teaching-purpose spectrum and teacher data or may be a standard conversion formula acquired by using a standard light source, as described above. Examples of the standard light source may include D50 and D65 defined by CIE (International Commission on Illumination). The type of the conversion formula used by the chromaticity calculator 615 is selected, for example, by selecting any of the radio buttons in the set region 72 of the operation screen 7 described above.

The chromaticity calculated by the chromaticity calculator 615 may be XYZ values, which are tristimulus values, $L^*a^*b^*$ values determined from the XYZ values, or any other chromaticity.

The chromaticity calculator 615 shown in FIG. 4 includes an XYZ value calculator 6151, which calculates XYZ values, and an $L^*a^*b^*$ value calculator 6152, which calculates $L^*a^*b^*$ values. The XYZ value calculator 6151 calculates XYZ values and causes the display section 15 to display the calculated XYZ values via the display controller 605. Similarly, the $L^*a^*b^*$ value calculator 6152 calculates $L^*a^*b^*$ values and causes the display section 15 to display the calculated $L^*a^*b^*$ values via the display controller 605.

2.14. Color Difference Calculation Step S14

The color difference calculator 616 then calculates the color difference between the calculated chromaticity and the reference chromaticity. A known color difference formula is used to calculate the color difference. Examples of the color difference formula may include CIE76 color difference formula ($\Delta E76$), CIE94 color difference formula ($\Delta E94$), CMC color difference formula ($\Delta Ecmc$), and CIE DE2000 color difference formula ($\Delta E00$). The reference chromaticity is a value inputted via the setting region 72 of the operation screen 7.

In the color difference calculation step S14, the color difference calculator 616 may perform the action of evaluating whether or not the color difference falls within the acceptable range.

The color difference calculator 616 causes the display section 15 to display the color difference and the result of the evaluation via the display controller 605.

As described above, the spectrometry method according to the present embodiment is a method used by the spectrometry apparatus 1 including the spectrometry section 10, the spectroscopic controller 602, the spectroscopic image generator 603, and the display section 15. The spectrometry section 10 includes the spectrometer 41, which spectrally separates the reflected light reflected off the imaging target X to select light having a predetermined wavelength, and the imaging device 21, which captures a spectroscopic image based on light fluxes having a plurality of wavelengths selected by the spectrometer 41. The spectroscopic controller 602 controls the action of the spectrometer 41. The spectroscopic image generator 603 generates the spectroscopic image. The display section 15 displays a teaching-purpose visualized image, which is an image that visualizes the imaging target X.

The spectrometry method according to the present embodiment includes the teaching-purpose spectroscopic image generation step S2, the teaching-purpose visualized image generation step S3, the first teaching-purpose spectrum generation step S4, the first icon display step S5, the first chromaticity teaching step S6, the conversion rule generation step S10, the measurement-purpose spectroscopic image generation step S11, the measurement-purpose spectrum generation step S12, and the chromaticity calculation step S13. The teaching-purpose spectroscopic image generation step S2 generates a teaching-purpose spectroscopic image as the spectroscopic image. The teaching-purpose visualized image generation step S3 generates a teaching-purpose visualized image and causes the display section 15 to display the generated teaching-purpose visualized image. The first teaching-purpose spectrum generation step S4 identifies the first teaching area A01 in the teaching-purpose visualized image and generates the first teaching-purpose spectrum, which is the optical spectrum of the first teaching area S01, from the teaching-purpose spectroscopic image. The first icon display step S5 calculates the first display color based on the display color of the first teaching area S01 of the teaching-purpose visualized image and causes the display section 15 to display the first icon a1 showing the first display color. The first chromaticity teaching step S6 accepts input of the first teacher data t1, which teaches the chromaticity of the first teaching area A01, in a position in the display section 15 that is the position corresponding to the first icon a1. The conversion rule generation step S10 generates a conversion rule based on the relationship between the first teaching-purpose spectrum and the first teacher data t1. The measurement-purpose spectroscopic image generation step S11 generates a measurement-purpose spectroscopic image as the spectroscopic image. The measurement-purpose spectrum generation step S12 generates from the measurement-purpose spectroscopic image a measurement-purpose spectrum that is an optical spectrum. The chromaticity calculation step S13 calculates the chromaticity from the measurement-purpose spectrum based on the conversion rule.

The thus configured spectrometry method allows the display section 15 to display the first icon a1 showing the first display color based on the first teaching area A01 of the teaching-purpose visualized image and input of the first teacher data t1 to be accepted in the position corresponding to the first icon a1. The user is therefore unlikely to make an input mistake, such as inputting wrong data, when the user inputs the first teacher data t1. The task of teaching the teaching-purpose spectrum the chromaticity, the task being necessary for measurement of the chromaticity from the teaching-purpose spectroscopic image, can be more accurately performed with a smaller risk of mistake. As a result, a spectrometry method capable of calculating more accurate chromaticity can be provided.

The spectrometry method according to the present embodiment further includes the second teaching-purpose spectrum generation step S7, the second icon display step S8, and the second chromaticity teaching step S9. The second teaching-purpose spectrum generation step S7 identifies the second teaching area A02 in the teaching-purpose visualized image and generates a second teaching-purpose spectrum that is an optical spectrum of the second teaching area A02 from the teaching-purpose spectroscopic image. The second icon display step S8 calculates the second display color based on the display color of the second teaching area A02 of the teaching-purpose visualized image and causes the display section 15 to display the second icon a2 showing the second display color. The second chromaticity teaching step S9 accepts input of the second teacher data t2, which teaches the chromaticity of the second teaching area A02, in a position in the display section 15 that is the position corresponding to the second icon a2.

The conversion rule generation step S10 includes the action of generating a conversion formula, as the conversion rule, derived from the relationship between the first teaching-purpose spectrum and the first teacher data t1 and the relationship between the second teaching-purpose spectrum and the second teacher data t2.

The configuration described above allows establishment of a conversion formula for calculating the chromaticity from a measurement-purpose spectrum under a predetermined environment. The chromaticity can therefore be more accurately and efficiently determined from a measurement-purpose spectrum under a predetermined environment.

The teaching-purpose visualized image generation step S3 may include the action of generating a teaching-purpose visualized image by using an image captured, for example, with an RGB camera provided separately from the spectrometry section 10. In the present embodiment, however, the teaching-purpose visualized image generation step S3 includes the action of generating a teaching-purpose visualized image by converting a teaching-purpose spectroscopic image.

According to the configuration described above, a teaching-purpose visualized image can be generated with no RGB camera or any other component provided, whereby the configuration of the spectrometry apparatus 1 can be simplified. When the spectrometry section 10 is spatially separate from the RGB camera, the illumination conditions and other conditions could change, whereas in the present embodiment, the illumination conditions do not change, whereby an adverse effect resulting from a difference in illumination conditions can be avoided.

The first teaching-purpose spectrum generation step S4 includes the action of causing the display section 15 to display the live view region 71, which is the first operation screen that accepts the operation of identifying the first teaching area A01. Further, the first chromaticity teaching step S6 includes the action of causing the display section 15 to display the teaching region 74, which is the second operation screen that accepts input of the chromaticity of the first teaching area A01.

The first chromaticity teaching step S6 of the spectrometry method according to the present embodiment then causes the display section 15 to display the live view region 71 and the teaching region 74 side by side.

According to the configuration described above, the user can look at the display color displayed in the first teaching area A01 in the live view region 71, where sample regions are displayed, and the first display color shown by the first icon a1 side by side. The user is therefore unlikely to make a selection mistake when successively assigning the plurality of sample regions to teaching areas, for example, the user is unlikely to accidentally select the same sample region or skip a sample region that should be selected. As a result, accurate chromaticity can be taught.

The spectrometry apparatus 1 according to the present embodiment includes the spectrometry section 10, the spectroscopic controller 602, the spectroscopic image generator 603, the display section 15, the visualized image generator 611, the display controller 605, the icon generator 612, the spectrum generator 613, and the chromaticity calculator 615, as described above. The spectrometry section 10 includes the spectrometer 41, which spectrally separates the reflected light reflected off the imaging target X to select light having a predetermined wavelength, and the imaging device 21, which captures a spectroscopic image based on light fluxes having a plurality of wavelengths selected by the spectrometer 41. The spectroscopic controller 602 controls the action of the spectrometer 41. The spectroscopic image generator 603 generates a teaching-purpose spectroscopic image and a measurement-purpose spectroscopic image. The display section 15 displays a teaching-purpose visualized image, which is an image that visualizes the imaging target X. The visualized image generator 611 generates the teaching-purpose visualized image. The display controller 605 controls the action of the display section 15. The icon generator 612 generates the first icon a1 and the second icon a2 to be displayed in the display section 15. The spectrum generator 613 generates a teaching-purpose spectrum based on the teaching-purpose spectroscopic image and generates a measurement-purpose spectrum based on the measurement-purpose spectroscopic image. The chromaticity calculator 615 calculates the chromaticity based on the measurement-purpose spectrum.

The spectrum generator 613 identifies the first teaching area A01 in the teaching-purpose visualized image and generates the first teaching-purpose spectrum, which is the teaching-purpose spectrum of the first teaching area S01, from the teaching-purpose spectroscopic image. The icon generator 612 calculates the first display color based on the display color of the first teaching area A01 of the teaching-purpose visualized image and generates the first icon a1 showing the first display color. Further, the display controller 605 causes the display section 15 to display the first icon a1 and causes the display section 15 to display the input fields that accept input of the first teacher data t1, which teaches the chromaticity of the first teaching area A01, in a position in the display section 15 that is the position corresponding to the first icon a1. The chromaticity calculator 615 calculates the chromaticity from the measurement-purpose spectrum based on the relationship between the first teaching-purpose spectrum and the first teacher data t1.

The configuration described above allows the display section 15 to display the first icon a1 showing the first display color based on the first teaching area A01 of the teaching-purpose visualized image and input of the first teacher data t1 to be accepted in the position corresponding to the first icon a1. The user is therefore unlikely to make an input mistake, such as inputting wrong data, when the user inputs the first teacher data t1. The task of teaching the teaching-purpose spectrum the chromaticity, the task being necessary for measurement of the chromaticity from the teaching-purpose spectroscopic image, can be more accurately performed with a smaller risk of mistake. As a result, a spectrometry apparatus 1 capable of calculating more accurate chromaticity can be provided.

The spectrometry method and the spectrometry apparatus according to the present disclosure have been described above based on the embodiment shown in the drawings, but the spectrometry apparatus according to the present disclosure is not limited to the spectrometry apparatus according to the embodiment described above, and the configuration of each portion of the spectrometry apparatus can be replaced with a portion having an arbitrary configuration having the same function. Further, another arbitrarily constituent part may be added to the spectrometry apparatus according to the embodiment described above.

Further, in the spectrometry method according to the present disclosure, a step for an arbitrary purpose may be added to the embodiment described above.

The spectrometry apparatus according to the present disclosure is incorporated for use, for example, in a smartphone, a tablet terminal, a personal computer, a digital camera, a video camcorder, a wearable terminal, a drone, a drive recorder, and an automatic driving system.

What is claimed is:

1. A spectrometry method used with a spectrometry apparatus including
    a spectrometry section including a spectrometer that spectrally separates reflected light reflected off an imaging target to select light having a predetermined wavelength and an imaging device that captures a spectroscopic image based on light fluxes having a plurality of wavelengths selected by the spectrometer,
    a spectroscopic controller that controls an action of the spectrometer,
    a spectroscopic image generator that generates the spectroscopic image, and
    a display section that displays a teaching-purpose visualized image that is an image that visualizes the imaging target,
    the method comprising:
    a teaching-purpose spectroscopic image generation step of generating a teaching-purpose spectroscopic image as the spectroscopic image;
    a teaching-purpose visualized image generation step of generating the teaching-purpose visualized image and causing the display section to display the generated teaching-purpose visualized image;
    a first teaching-purpose spectrum generation step of identifying a first teaching area in the teaching-purpose visualized image and generating a first teaching-purpose spectrum that is an optical spectrum of the first teaching area from the teaching-purpose spectroscopic image;
    a first icon display step of calculating a first display color based on a display color of the first teaching area of the teaching-purpose visualized image and causing the display section to display a first icon showing the first display color;
    a first chromaticity teaching step of accepting input of first teacher data that teaches chromaticity of the first teaching area in a position in the display section that is a position corresponding to the first icon;
    a conversion rule generation step of generating a conversion rule based on a relationship between the first teaching-purpose spectrum and the first teacher data;
    a measurement-purpose spectroscopic image generation step of generating a measurement-purpose spectroscopic image as the spectroscopic image;
    a measurement-purpose spectrum generation step of generating from the measurement-purpose spectroscopic image a measurement-purpose spectrum that is an optical spectrum; and
    a chromaticity calculation step of calculating chromaticity from the measurement-purpose spectrum based on the conversion rule.

2. The spectrometry method according to claim 1, further comprising:
    a second teaching-purpose spectrum generation step of identifying a second teaching area in the teaching-purpose visualized image and generating a second teaching-purpose spectrum that is an optical spectrum of the second teaching area from the teaching-purpose spectroscopic image;
    a second icon display step of calculating a second display color based on a display color of the second teaching area of the teaching-purpose visualized image and causing the display section to display a second icon showing the second display color; and
    a second chromaticity teaching step of accepting input of second teacher data that teaches chromaticity of the second teaching area in a position in the display section that is a position corresponding to the second icon,
    wherein the conversion rule generation step includes an action of generating a conversion formula, as the conversion rule, derived from a relationship between the first teaching-purpose spectrum and the first teacher data and a relationship between the second teaching-purpose spectrum and the second teacher data.

3. The spectrometry method according to claim 1, wherein the teaching-purpose visualized image generation step includes an action of generating the teaching-purpose visualized image by converting the teaching-purpose spectroscopic image.

4. The spectrometry method according to claim 1,
    wherein the first teaching-purpose spectrum generation step includes an action of causing the display section to display a first operation screen that accepts operation of identifying the first teaching area,
    the first chromaticity teaching step includes an action of causing the display section to display a second operation screen that accepts input of the chromaticity of the first teaching area, and
    the display section is caused to display the first operation screen and the second operation screen side by side.

5. A spectrometry apparatus comprising:
    a spectrometry section including a spectrometer that spectrally separates reflected light reflected off an imaging target to select light having a predetermined wavelength and an imaging device that captures a spectroscopic image based on light fluxes having a plurality of wavelengths selected by the spectrometer;
    a spectroscopic controller that controls an action of the spectrometer;
    a spectroscopic image generator that generates a teaching-purpose spectroscopic image and a measurement-purpose spectroscopic image;
    a display section that displays a teaching-purpose visualized image that is an image that visualizes the imaging target;
    a visualized image generator that generates the teaching-purpose visualized image;
    a display controller that controls an action of the display section;
    an icon generator that generates an icon to be displayed in the display section;
    a spectrum generator that generates a teaching-purpose spectrum based on the teaching-purpose spectroscopic image and generates a measurement-purpose spectrum based on the measurement-purpose spectroscopic image; and
    a chromaticity calculator that calculates chromaticity based on the measurement-purpose spectrum, wherein the spectrum generator identifies a first teaching area in the teaching-purpose visualized image and generates a first teaching-purpose spectrum that is the teaching-purpose spectrum of the first teaching area from the teaching-purpose spectroscopic image, the icon generator calculates a first display color based on a display color of the first teaching area of the teaching-purpose visualized image and generates a first icon showing the first display color, the display controller causes the display section to display the first icon and causes the display section to display an input field that accepts input of first teacher data that teaches chromaticity of the first teaching area in a position in the display section that is a position corresponding to the first icon, and the chromaticity calculator calculates chromaticity from the measurement-purpose spectrum based on a relationship between the first teaching-purpose spectrum and the first teacher data.

* * * * *